United States Patent [19]

Nini

[11] Patent Number: 5,348,261

[45] Date of Patent: Sep. 20, 1994

[54] LOW MASS MANUAL TWO-WAY SEAT ADJUSTER

[75] Inventor: James P. Nini, Mt. Clemens, Mich.

[73] Assignee: General Motors Corporation, Detroit, Mich.

[21] Appl. No.: 993,546

[22] Filed: Dec. 21, 1992

[51] Int. Cl.$^5$ ............................................. B60N 2/00
[52] U.S. Cl. ................................... 248/430; 248/424; 248/429
[58] Field of Search ................... 248/424, 429, 430; 297/344.1, 473

[56] References Cited

U.S. PATENT DOCUMENTS

| | | | |
|---|---|---|---|
| 1,735,518 | 11/1929 | Van Valkenburg et al. | 248/430 |
| 1,756,230 | 4/1930 | Van Valkenburg et al. | |
| 2,102,979 | 12/1937 | Smith. | |
| 2,141,093 | 12/1938 | Richter et al. | |
| 2,225,074 | 12/1940 | Miller. | |
| 2,239,917 | 4/1941 | Hunter et al. | |
| 2,264,860 | 12/1941 | Saunders | 248/430 |
| 2,396,511 | 3/1946 | Issigonis. | |
| 3,022,976 | 2/1962 | Zia. | |
| 3,100,617 | 8/1963 | Radke et al. | 248/430 |
| 4,157,797 | 6/1979 | Fox. | |
| 4,209,159 | 6/1980 | Becker et al. | 248/430 |
| 4,378,927 | 4/1983 | Graves. | |
| 4,432,524 | 2/1984 | Wize. | |
| 4,483,504 | 11/1984 | Düwelshöft | 248/429 |
| 4,550,933 | 11/1985 | Patterson | 297/473 X |
| 4,720,072 | 1/1988 | Kitano et al. | 297/473 X |
| 4,760,988 | 8/1988 | Bianchi et al. | |
| 4,790,597 | 12/1988 | Bauer et al. | 297/473 X |
| 4,940,285 | 7/1990 | Suzuki et al. | 248/430 X |
| 4,941,636 | 7/1990 | Fujiwara et al. | 248/430 |
| 5,014,960 | 5/1991 | Kimura. | |

FOREIGN PATENT DOCUMENTS

| | | | |
|---|---|---|---|
| 255133 | 3/1988 | German Democratic Rep. | 248/430 |
| 637219 | 5/1950 | United Kingdom | 248/430 |

Primary Examiner—David A. Scherbel
Assistant Examiner—Derek J. Berger
Attorney, Agent, or Firm—Ernest E. Helms

[57] ABSTRACT

A seat fore and aft adjuster for a vehicle is provided which in a preferred embodiment includes a pair of parallel elongate channels secured to the floor of the vehicle, both channels having an inner space defined by vertical, concave upper and concave lower inner surfaces, the channels having a locking plate with a series of associated notches, and fore and aft rollers, the fore rollers including a tubular axle housing rotatively mounting elastomeric rollers and the housing being threadably affixed with a seat frame while at the same time affixing a bracket to the seat frame, and an independent guide secured to the bracket and extending into the channels' inner spaces and sliding against the upper surfaces thereof. A pin is slidably mounted in the fore axles for locking engagement with the locking plate. A leaf spring fixed with respect to the seat frame biases the locking pin toward engagement with the lock plate.

10 Claims, 3 Drawing Sheets

LOW MASS MANUAL TWO-WAY SEAT ADJUSTER

FIELD OF THE INVENTION

The present invention generally pertains to an adjuster for a seat and, more particularly, to an adjuster having a wheeled arrangement for fore and aft movement.

DISCLOSURE STATEMENT

Typically, a vehicle seat adjuster comprises rolling bearing means interposed between a stationary rail mounted on the floor and a slider rail secured to the bottom of the seat. The adjuster is constructed so as to have the necessary strength and stability characteristics required for today's vehicle environment. As a result, the dual rail adjuster system is widely accepted throughout the vehicle industry. However, despite its popularity, the system has one critical disadvantage: its excessive weight. Each adjuster comprises two heavy rails and associated hardware. In a vehicle, at least two seats are adjustable and each requires a parallel pair of adjusters. When totaled, it is obvious that adjustable seats using dual rail adjusters impose a considerable weight penalty. The significant disadvantage of the weight is self-evident, especially for vehicles striving for an environmentally-mandated goal of improved fuel efficiency.

SUMMARY OF THE INVENTION

The present invention comprises a seat adjuster system that meets necessary performance characteristics but weighs significantly less than the dual rail adjuster discussed above. Importantly, the present invention does not appreciably increase the cost of providing seat adjusters.

The present invention has a seat that comprises independent rollers mounted directly to it. The rollers are guided by a single stationary channel at each side of the seat in an alternate manner to that previously revealed.

These and other objects and advantages of the present invention will be apparent from the detailed description of a preferred embodiment thereof when considered in conjunction with the accompanying drawings.

DETAILED DESCRIPTION OF A PREFERRED EMBODIMENT

Figures 1, 2:
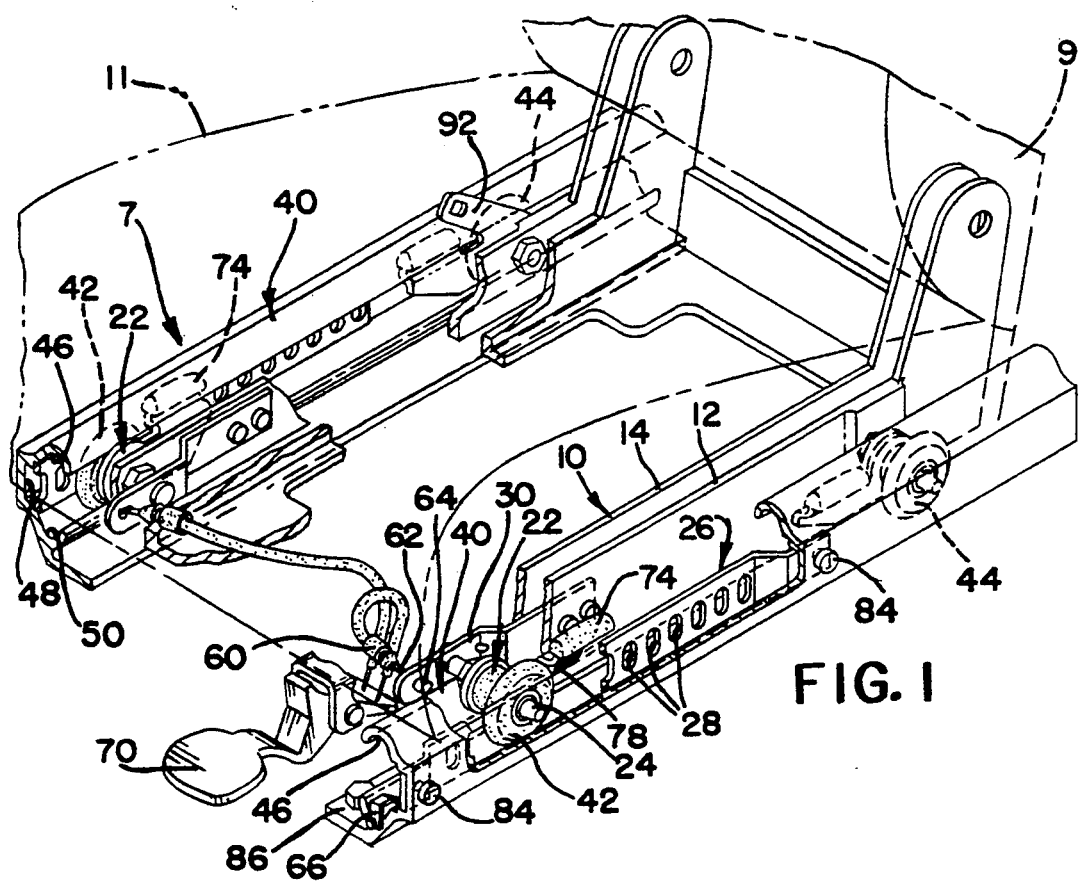
FIG. 1 is a perspective view of a preferred embodiment seat adjuster according to the present invention.
FIG. 2 is a front sectional view with portions cut away of the seat adjuster shown in FIG. 1.
Figure 3:
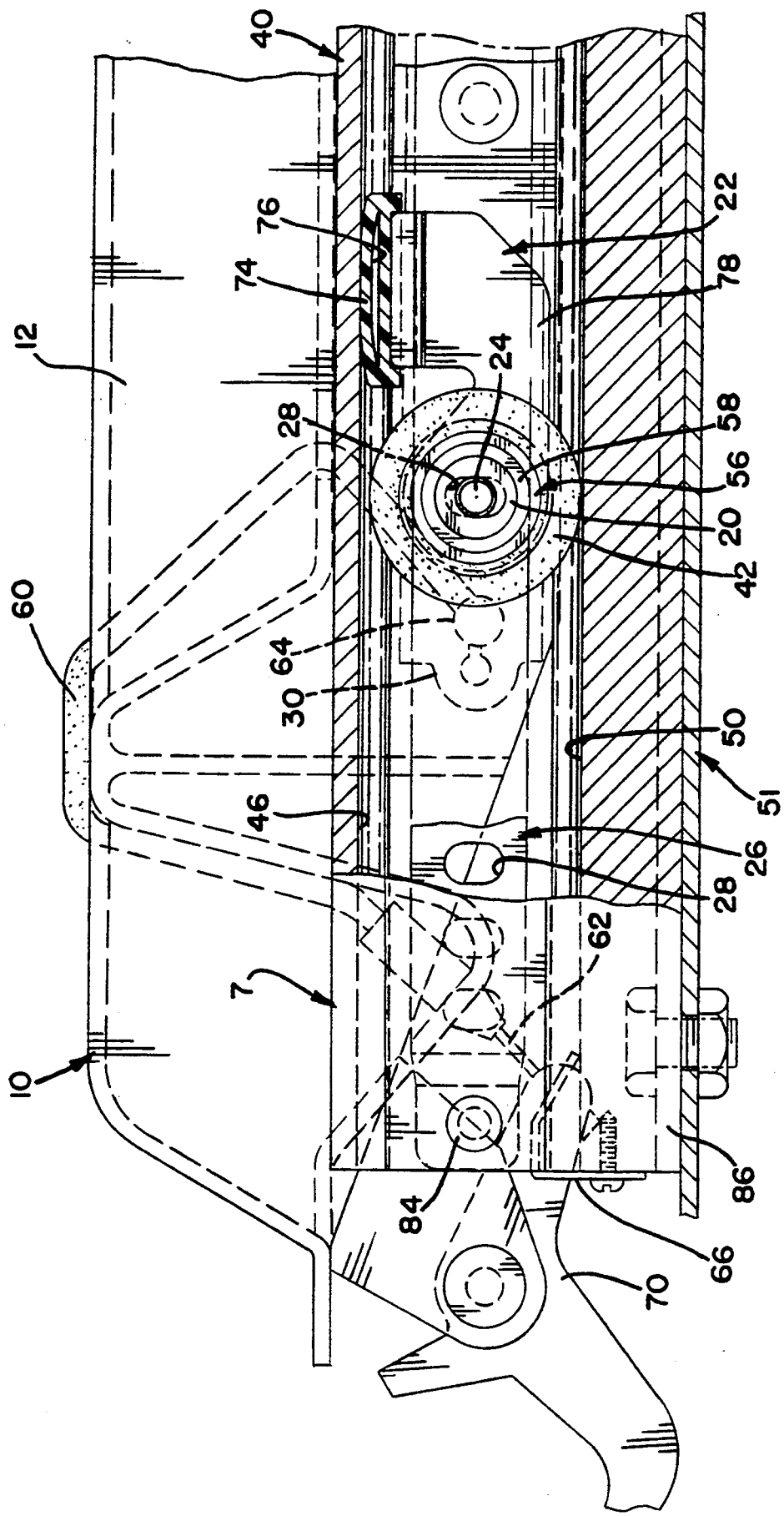
FIGS. 3 and 4 are taken along lines 3—3 and 4—4 in FIG. 2, respectively.
Figure 4:
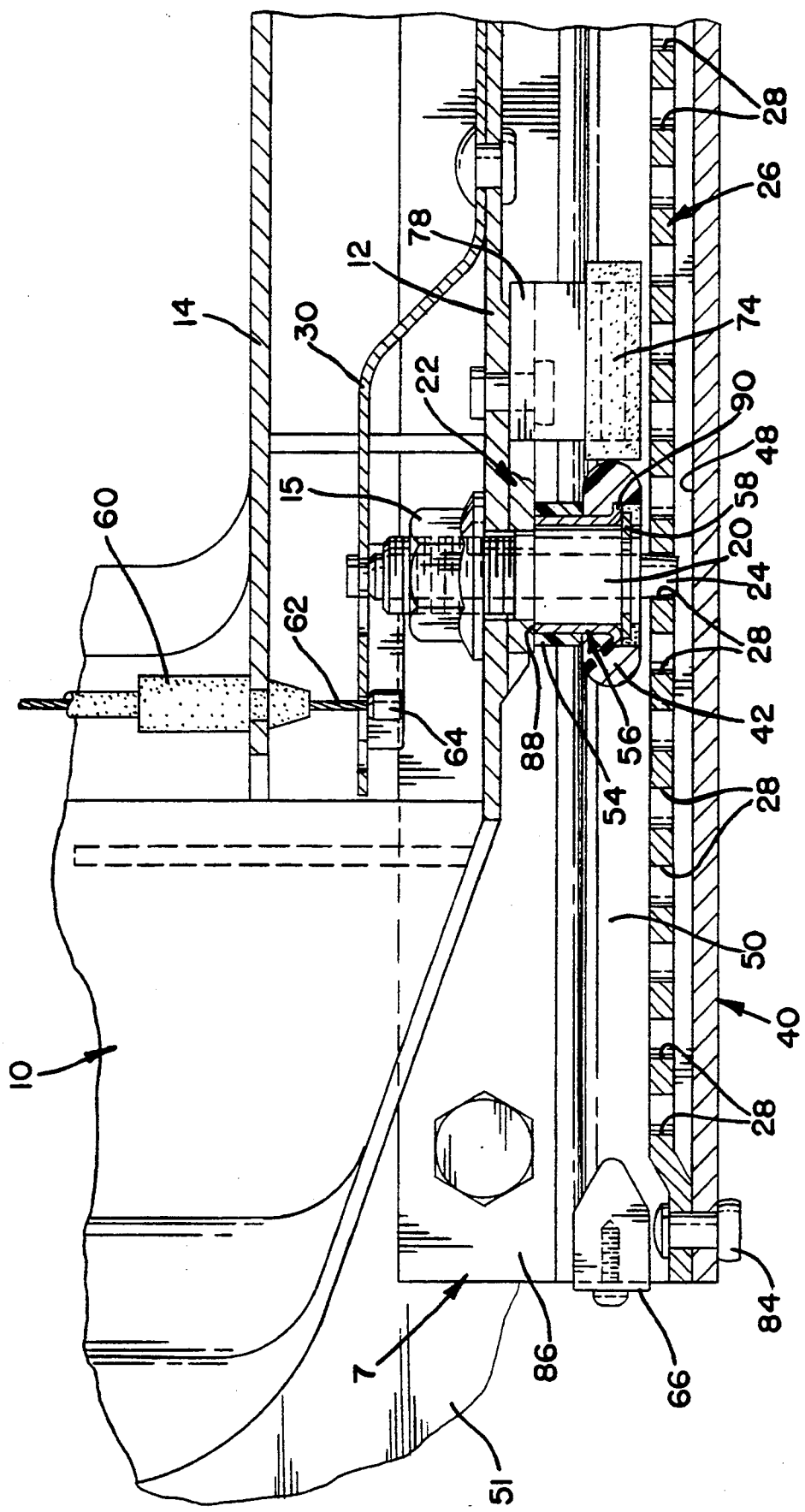

Referring to FIGS. 1 through 4, a preferred embodiment seat adjuster 7 is provided. The fore and aft seat adjuster is oriented in a fore and aft direction and attached thereto is a multi-member seat frame member 10. Seat frame member 10 has inner and outer walls 14 and 12 which support a seat bun 11 and also provide for pivotal connection of a seat back 9 in a conventional manner.

The seat adjuster 7 has a pair of channels 40. Each channel has an inner surface as defined by an upper concave surface 46 and a lower concave curvilinear surface 50, which are joined by a generally vertical inner surface 48. The channel 40 is also provided with a lock bar 26 which is connected thereto by rivets 84. The lock plate or bar 26 has a series of equally spaced apertures 28 to allow for insertion of a locking pin 24. The locking plate 26 in alternative embodiments may be welded or affixed by a thread connector to the channel 40. Alternatively, the lock plate 26 may be eliminated altogether by placing the apertures 28 into the channel section 40, if so desired.

The channel 40 has a lower portion 86 with an aperture to allow it to be boltably attached to the vehicle floor panel 51. The vehicle floor panel 51 is slightly submerged as compared with the remainder of the vehicle floor panel 57, thereby allowing the frame 10 of the vehicle seat to have as low a profile as possible.

Captured within the channel 40 and in rolling contact with the lower portion 50 of the channel is the forward vehicle wheel 42 and a rearward vehicle wheel 44. Both wheels are typically fabricated from a polymeric, preferably elastomeric, material and support the frame for movement fore and aft with respect to the vehicle floor. To prevent the rollers or wheels 42 and 44 from coming out of the channel, there are provided stops 66 (only the forward stop is shown) which effectively capture the wheels 42 and 44 within the channel 40. The wheels have a cross-sectional profile generally aligned with the lower concave surface 50.

The wheel 42 is mounted by a tubular shaft provided by a housing member 20. Housing member 20 is threadably connected with the frame wall 12 by virtue of a frame nut 15. A shoulder 88 in the housing member captures a bracket 22 to the frame wall 12 also. The housing has surrounding it a cylindrical mounting member 56 which has a flared end 90 which mounts the wheel 42 on the tubular axle 20. The mounting member 56 is held in place by a spring clip 58. Since the wheel is an elastomeric member, contact of the wheel with the bracket 22 which is typically metallic would cause an increase in friction. Therefore, there is a polymeric spacer 54 typically comprised of nylon, and mounting member 56 is allowed to rotate to minimize relative movement of the mounting member 56 with respect to the wheel 42 to prevent cutting the wheel 42.

The housing member 20 has inserted therein a locking pin 24. The locking pin is biased into engagement with one of the apertures 28 by a leaf spring 30. Leaf spring 30 is riveted to the outer frame wall member 12. The leaf spring 30 captures an end of the locking pin 24, pushing it outwardly, and also has an aperture for passage of a cable 62 which has a connecting bullet 64. The cable 62 is guided by cable guide 60. The cable guide 60 is connected with a pivotal latch 70.

Referring back to the bracket 22, the bracket has an extension 78 which has at a top end a guide shoe 74, which is in continual contact with the upper concave surface 46 of the channel. The shoe 74 also has a slot or hole 76 to allow it to be more compressible. The upper guide shoe 74 is in continual contact; therefore, "chucking", which is vertical rocking of the seat, is eliminated since the guide 74 and the wheels 42 will always be in contact with their respective channel surfaces. In another embodiment not shown, the bracket 22 is one continuous member connected with both housings and having only one centrally located shoe.

In operation to allow adjustment of the seat, the release latch 70 is pulled upward by the vehicle seat occupant, which causes a tensional force to be exerted upon cable 62, pulling the locking pin 24 out of its engagement with the lock bar aperture 28. Release of the latch 70 will allow the pin 24 to re-engage with one of the apertures 28 to set the new position of the seat.

Another advantage of the applicant's invention is that the rear brackets 92 allow for direct attachment of the vehicle seat belt. Therefore, mounting of the vehicle seat belt to the floor of the vehicle is eliminated, and readjustment of the seat belt due to adjustment in the seat can be eliminated or reduced.

Although details of a preferred embodiment have been specified above, they are only intended to illustrate and not limit the present invention. Various modifications or adaptations thereof are possible and will be readily identified by persons skilled in the art. However, such changes are intended to be considered with reference to the full spirit and scope of the claimed invention.

The embodiments of the invention in which an exclusive property or privilege is claimed are defined as follows:

1. An adjuster for fore and aft positioning of a vehicle seat frame, the adjuster comprising:
   a pair of parallel elongate channels secured to the floor of the vehicle, both channels having an inner space generally defined by vertical, upper and lower inner surfaces;
   at least one tubular axle;
   a plurality of independent rollers, at least one of the rollers being mounted on at least one tubular axle, each of the rollers being secured to and supporting opposite sides of the seat frame and being aligned for rolling along the channel lower surfaces;
   a bracket fixed with the tubular axle and with the seat frame;
   independent guide means extending from the bracket, at least one guide means separately extending into each channel's inner spaces and sliding against the upper surface thereof;
   locking means to selectively secure the seat frame to at least one of the channels at a plurality of predetermined positions, the locking means extending through the tubular axle; and
   stop means to limit fore and aft travel of said seat to a predetermined distance.

2. A seat adjuster as described in claim 1 wherein the channel inner space is defined by curvilinear concave upper and curvilinear concave lower inner surfaces.

3. A seat adjuster as described in claim 1 further having locking plate means associated with at least one of the channels, a locking pin being spring biased for engagement into the locking plate means providing the locking means to secure the seat frame to the channel.

4. A seat adjuster as described in claim 3 wherein the spring biasing is provided by a leaf spring.

5. A seat adjuster as described in claim 1 wherein the tubular axle is provided by a housing unit which, by a threadable fixation with the seat frame, also captures the bracket with the seat frame.

6. A seat adjuster as described in claim 1 wherein the guide means has a shoe with a hole in it to increase its compressibility.

7. A seat adjuster as described in claim 1 having at least one roller with a tubular axle affixed with a bracket, the bracket serving as a latch for a seat belt attachment.

8. A seat adjuster as described in claim 1 wherein the wheels are fabricated from a polymeric material.

9. A manual seat adjuster for fore and aft positioning of a vehicle seat frame, the adjuster comprising:
   a pair of parallel elongate channels secured to the floor of the vehicle, both channels having an inner space defined by vertical, concave upper and concave lower inner surfaces, the channels having a locking plate with a series of notches associated therewith;
   fore and aft roller means, the fore roller means including a tubular axle housing rotatively mounting elastomeric rollers and the housing means being threadably affixed with the seat frame while at the same time affixing a bracket to the seat frame;
   an independent guide means secured to the bracket and extending into the channels' inner spaces and sliding against the upper surfaces thereof;
   pins slidably mourned in the fore axle housings for locking engagement with the respective locking plates;
   a leaf spring for each pin fixed with respect to the seat frame biasing the pin toward engagement with the locking plate;
   means for removal of the pin from the locking plate; and
   stop means to limit fore and aft travel of the seat to a predetermined distance.

10. An adjuster for fore and aft positioning of a vehicle seat frame, the adjuster comprising:
    a pair of parallel elongate channels secured to the floor of the vehicle, both channels having an inner space generally defined by vertical, upper and lower inner surfaces, the lower inner surface being concave upwardly;
    at least one tubular axle;
    a plurality of independent rollers, at least one of the rollers being mounted on at least one tubular axle, each of the rollers being secured to and supporting opposite sides of the seat frame and being aligned for rolling along the channel lower surfaces, the roller cross-sectional profile being generally aligned with the channel lower inner surface;
    independent guide means secured to the seat frame, at least one guide means separately extending into each channel's inner spaces and continually contacting and sliding against the upper surface of the channel's inner space;
    locking means to selectively secure the seat frame to at least one of the channels at a plurality of predetermined positions, the locking means extending through the tubular axle; and
    stop means to limit fore and aft travel of said seat to a predetermined distance.

* * * * *